US010261979B2

(12) United States Patent
Nikitin et al.

(10) Patent No.: US 10,261,979 B2
(45) Date of Patent: Apr. 16, 2019

(54) METHOD AND APPARATUS FOR RENDERING A SCREEN-REPRESENTATION OF AN ELECTRONIC DOCUMENT (71) Applicant: YANDEX EUROPE AG, Lucerne (CH)

(72) Inventors: Konstantin Sergeevitch Nikitin, Kaluga region (RU); Ivan Vladimirovich Kotenkov, Moscow (RU)

(73) Assignee: Yandex Europe AG, Lucerne (CH)

( * ) Notice: Subject to any disclaimer, the term of this patent is extended or adjusted under 35 U.S.C. 154(b) by 24 days.

(21) Appl. No.: 15/262,267

(22) Filed: Sep. 12, 2016

(65) Prior Publication Data
US 2017/0083481 A1   Mar. 23, 2017

(30) Foreign Application Priority Data
Sep. 23, 2015   (RU) ................................ 2015140584

(51) Int. Cl.
*H04M 1/64* (2006.01)
*G06F 17/21* (2006.01)

(52) U.S. Cl.
CPC .................................. *G06F 17/211* (2013.01)

(58) Field of Classification Search
CPC ........... G06F 17/2247; G06F 17/30896; G06F 17/3089; G06F 17/211

(Continued)

(56) References Cited

U.S. PATENT DOCUMENTS 5,212,770 A * 5/1993 Smith ..................... G06T 11/60
715/746
5,708,825 A 1/1998 Sotomayor
(Continued)

FOREIGN PATENT DOCUMENTS

DE 102010001182 A1 5/2011
EP 0984368 A1 3/2000
WO 2004021219 A2 3/2004

OTHER PUBLICATIONS

Russian Search report from RU patent application No. 2015140584 dated Oct. 14, 2016.

(Continued)

*Primary Examiner* — Scott T Baderman
*Assistant Examiner* — Hassan Mrabi
(74) *Attorney, Agent, or Firm* — BCF LLP (57) ABSTRACT

There is disclosed a method of rendering a screen-representation of an electronic document. The method is executed on an electronic device. The method comprises: acquiring, by the electronic device, the electronic document to be rendered, the electronic document comprising a content portion and a rendering-instruction portion; generating, by the electronic device, at least one rendering command, the at least one rendering command based on the at least one instruction, identifying, by the electronic device, a portion of the content portion to be modified; while generating the at least one rendering command, generating, by the electronic device, at least one additional rendering command, the at least one additional rendering command not directly derivable from the at least one instruction; generating the screen-representation of the electronic document based on a combination of the at least one rendering command and the at least one additional rendering command.

14 Claims, 6 Drawing Sheets

(58) Field of Classification Search
USPC .......................................................... 715/234
See application file for complete search history.

(56) References Cited

U.S. PATENT DOCUMENTS

| | | | |
|---|---|---|---|
| 5,745,360 | A | 4/1998 | Leone et al. |
| 5,978,817 | A * | 11/1999 | Giannandrea ..... G06F 17/30902 |
| | | | 707/E17.12 |
| 6,122,647 | A | 9/2000 | Horowitz et al. |
| 6,581,065 | B1 | 6/2003 | Rodkin et al. |
| 7,356,762 | B2 | 4/2008 | Van Driel |
| 7,418,657 | B2 | 8/2008 | Gorelick et al. |
| 7,496,832 | B2 | 2/2009 | Chen et al. |
| 7,535,475 | B2 * | 5/2009 | Sorotokin ........... G06F 17/2247 |
| | | | 345/420 |
| 7,668,929 | B1 | 2/2010 | Ruhlen |
| 7,761,783 | B2 * | 7/2010 | Lahman ................. G06F 3/121 |
| | | | 715/234 |
| 8,010,816 | B2 | 8/2011 | Wong et al. |
| 8,020,089 | B1 * | 9/2011 | Brichford ........... G06F 17/2247 |
| | | | 715/234 |
| 8,610,724 | B2 | 12/2013 | Garg |
| 8,643,653 | B2 | 2/2014 | Marchant et al. |
| 8,769,398 | B2 | 7/2014 | Decker et al. |
| 2002/0069222 | A1 | 6/2002 | McNeely |
| 2004/0085358 | A1 | 5/2004 | Tolmer et al. |
| 2006/0034434 | A1 * | 2/2006 | Kashi ..................... G06F 9/543 |
| | | | 379/93.07 |
| 2007/0234195 | A1 | 10/2007 | Wells |
| 2008/0010338 | A1 * | 1/2008 | Curtis .................. G06F 17/3089 |
| | | | 709/203 |
| 2008/0010341 | A1 * | 1/2008 | Curtis ..................... G06F 17/21 |
| | | | 709/204 |
| 2008/0010345 | A1 * | 1/2008 | Curtis ............... G06F 17/30861 |
| | | | 709/205 |
| 2008/0010386 | A1 * | 1/2008 | Curtis ................. G06F 17/3089 |
| | | | 709/246 |
| 2008/0010387 | A1 * | 1/2008 | Curtis ................. G06F 17/3089 |
| | | | 709/246 |
| 2008/0010388 | A1 * | 1/2008 | Curtis ..................... G06Q 10/10 |
| | | | 709/246 |
| 2008/0010609 | A1 * | 1/2008 | Curtis ................. G06F 17/3089 |
| | | | 715/810 |
| 2008/0040661 | A1 * | 2/2008 | Curtis ................. G06F 17/3089 |
| | | | 715/243 |
| 2008/0055317 | A1 | 3/2008 | Abel et al. |
| 2008/0065769 | A1 * | 3/2008 | Curtis ..................... G06F 9/542 |
| | | | 709/226 |
| 2008/0126944 | A1 * | 5/2008 | Curtis ............... G06F 17/30896 |
| | | | 715/733 |
| 2008/0304113 | A1 | 12/2008 | Curry et al. |
| 2009/0288019 | A1 * | 11/2009 | Tunning .............. G06F 17/3089 |
| | | | 715/760 |
| 2010/0329573 | A1 * | 12/2010 | Tsujino .............. G06K 9/00463 |
| | | | 382/209 |
| 2010/0332967 | A1 | 12/2010 | Kraft et al. |
| 2013/0257752 | A1 | 10/2013 | Tripathi et al. |
| 2013/0339884 | A1 * | 12/2013 | Wilson .................... G06F 9/453 |
| | | | 715/764 |
| 2014/0104243 | A1 | 4/2014 | Sakariya et al. |
| 2014/0149834 | A1 | 5/2014 | Balasubramanian et al. |
| 2014/0212040 | A1 | 7/2014 | Walker et al. |
| 2014/0365794 | A1 | 12/2014 | Decker et al. |
| 2015/0082145 | A1 * | 3/2015 | Ames .................. G06F 17/2247 |
| | | | 715/234 |
| 2016/0360382 | A1 * | 12/2016 | Gross ................... G06F 3/0488 |

OTHER PUBLICATIONS

English abstract of EP 0984368 retrieved on Jan. 20, 2017.
English abstract of DE102010001182 retrieved on Jan. 20, 2017.
Osmani, Gone in 60 Frames Per Second: A Pinterest Paint Performance Case Study, Jun. 10, 2013, https://www.smashingmagazine.com/2013/06/pinterest-paint-performance-case-study/, 26 pages.
Jank Free, http:f/jankfree.org/, 12 pages.
window.requestAnimation Frame(), https://developer.mozilla.org/en-US/docs/Web/API/window/requestAnimationFrame, 4 pages.
requestAnimationFrame, http://creativejs.com/resources/requestanimationframe/, 5 pages.
Adventures in WebKit land, Aug. 30, 2013, http://kristerkari.github.io/adventures-in-webkit-land/blog/2013/08/30/fixing-a-parallax-scrolling-website-to-run-in-60-fps/, 5 pages.
fhtr Browser rendering loop, Apr. 1, 2011, http://fhtr.blogspot.ru/2011/04/browser-rendering-loop.html, 3 pages.
Zakas, Better JavaScript animations with requestAnimationFrame, May 3, 2011, Better JavaScript animations with requestAnimationFrame—NCZOnline, https://www.nczonline.net/blog/2011/05/03/better-javascript-animations-with-requestanimationframe/, 9 pages.
Heikkinen, Measuring HTML5 Browser FPS, or, You're Not Measuring What You Think You're Measuring, Mar. 23, 2011, Seth Ladd's Blog, http://blog.sethladd.com/2011/03/measuring-html5-browser-fps-or-youre.html, 5 pages.
What is the easiest way to make your browser refresh a page every say, 5 seconds?, http://superuser.com/questions/200088/what-is-the-easiest-way-to-make-your-browser-refresh-a-page-every-say-5-seconds, 4 pages.
Probets et al., Dynamic link inclusion in online PDF journals, 14 pages.
Worring, Hyperdocument Generation using OCR and Icon Detection, 5 pages.

* cited by examiner

METHOD AND APPARATUS FOR RENDERING A SCREEN-REPRESENTATION OF AN ELECTRONIC DOCUMENT

CROSS-REFERENCE

The present application claims priority to Russian Patent Application No. 2015140584, filed Sep. 23, 2015, entitled "METHOD AND APPARATUS FOR RENDERING A SCREEN-REPRESENTATION OF AN ELECTRONIC DOCUMENT", the entirety of which is incorporated herein by reference.

TECHNICAL FIELD

The present technology relates to methods and apparatuses for rendering an electronic document, and more specifically to a method and an apparatus for rendering a screen-representation of the electronic document.

BACKGROUND

A typical user has access to a number of electronic devices to execute one or more communications needs of the user. For example, a typical user may have access to a desktop computer, a laptop, a smartphone and a tablet device for executing one or more actions, such as: sending and receiving e-mails, browsing the Internet, sending different types of text messages, listening to music and watching streamed content, making voice calls and the like.

In recent years, a typical electronic device the user may use offers converging services—i.e. ability to execute divergent tasks by a single computing apparatus. For example, a typical smart phone can allow the user to execute such divergent tasks as: sending e-mail (text entry and data transmission), browsing Internet and making audio calls (cellular or data).

A typical browser executed on the electronic device (such as a Chrome™ browser, for example) has a functionality that allows the browser to locate and highlight (or otherwise visually and functionally modify) certain portions of text of interest). As an example, such a process is executed to support additional functionality such as Skype™ calls to Skype addresses or telephone numbers, which Skype calls can be initiated by clicking on (or otherwise actuating) a highlighted phone number or Skype address in a body of content displayed in the browser, such as a web page and the like. When implementing such "Skype click to call" function, the browser locates telephone numbers in the web page to be displayed in the browser. A browser may identify a telephone number in a body of content displayed in the browser, highlight the identified telephone number and render it interactable (i.e. enabling the user to click on the highlighted telephone number in order to initiate the Skype call).

U.S. Pat. No. 7,418,657 discloses methodology through which a host site may automatically insert relevant links into a set of text. In this methodology, the contents of the text are compared against a database containing character strings, and the character strings from the database contained in the text are identified. Each of the character strings in the database has an associated link that connects to other webpages on the same website or other websites. For each character string of the database found in the contents of the text, the associated link is inserted into the text. In this way, only relevant links are inserted into the text.

U.S. Pat. No. 7,668,929 teaches procedure for preparing electronic resources for delivery to client computers is disclosed. When rendered on a browser for display, the electronic resources (e.g., web pages) include a reference link to another electronic resource. In response to receiving a request for delivery of a specific resource to a client computer, a server computer retrieves the resource from storage and examines the resource to locate any link identifiers contained therein. If a link identifier is detected, the network address corresponding to this link identifier is identified by the server and incorporated into the requested electronic resource in place of the link identifier. The prepared resource is then delivered to the client computer for rendering on a browser.

U.S. Pat. No. 6,581,065 discloses a system for automatically providing hypertext for character strings of a text file at a content server. A central server provides central control of the links of text files of a plurality of content servers in an information network such as the Internet. The central server intermittently updates each content server with new character strings and/or destination addresses, such as Uniform Resource Locators (URLs). The content servers also update the central server with new character strings. Optionally, each content server can query the central server on a real-time basis to obtain a destination address for a character string which does not have a corresponding valid destination address. The central server responds to such queries by searching its master databases, and using a search engine if required. Hit count data is maintained at the content servers and transmitted to the central server intermittently.

US 2008/0304113 teaches systems and methods that facilitate mitigating searchable electronic document size increases associated with embedded font definition files by embedding only font size information. When a document is scanned or converted into a PDF or XPS document image, glyphless font size information describing character dimensions for fonts used in the document is embedded into the document image. The glyphless font size information is on the order of a few kilobytes in size, and is later read by a searcher to facilitate highlighting search terms identified in the document image in response to a user query. A highlight block is generated to have a width substantially equal to the combined widths of the characters in the queried term, which are described in the glyphless font information. The highlight block is then overlaid on the image of the queried term, and presented to the user.

US patent application 2010/0332967 discloses methods and systems for automatically generating web page augmentation for web pages. In one embodiment, a computer implemented method for automatically providing a web page augmentation is provided. The method includes analyzing content of a web page to determine if a web page augmentation is needed for the web page. If the web page augmentation is needed, the method proceeds to determine a type of web page augmentation needed for the web page based on the content of the web page. The method also includes issuing a request to generate the web page augmentation, and receiving the web page augmentation sent by a web page augmentation generating system. The method further includes displaying the web page augmentation.

U.S. Pat. No. 7,428,711 discloses Methods for rendering electronic ink with highlighting attributes include: (a) receiving data representing at least one electronic ink stroke including a highlighting attribute; (b) rendering a first highlighting stroke in a first dimension and in a first highlighting color and/or pattern; and (c) rendering an ink color stroke in an ink color and/or pattern and in a second dimension that is smaller than the first dimension to produce a composite stroke that has a highlighted appearance. When the highlighted stroke is selected, this stroke may be rendered with a third, inner layer that is narrower than the ink colored layer, in a highlight color and/or pattern. This invention also relates to systems and computer-readable media for performing these methods, and to data structures that include a highlight attribute with electronic ink data.

SUMMARY

It is an object of the present technology to ameliorate at least some of the inconveniences present in the prior art.

According to a first broad aspect of the present technology, there is provided a method of rendering a screen-representation of an electronic document. The method is executed on an electronic device, the electronic device having a display. The method comprises: acquiring, by the electronic device, the electronic document to be rendered, the electronic document comprising a content portion and a rendering-instruction portion, the rendering-instruction portion containing at least one instruction for enabling the electronic device to render the content portion on the display; generating, by the electronic device, at least one rendering command, at least one rendering command based on the at least one instruction, identifying, by the electronic device, a portion of the content portion to be modified; while generating at least one rendering command, generating, by the electronic device, at least one additional rendering command, the at least one additional rendering command not directly derivable from the at least one instruction, the generating at least one additional rendering command being based on the portion of the content portion to be modified; generating, by the electronic device, the screen-representation of the electronic document based on a combination of the at least one rendering command and the at least one additional rendering command.

In some embodiments of the method, the portion of the content portion to be modified is a textual portion.

In some embodiments of the method, the identifying the portion of the content portion to be modified comprises: identifying a totality of text within the content portion; identifying, within the totality of text, the textual portion to be modified.

In some embodiments of the method, the identifying, within the totality of text, the textual portion to be modified comprises applying a rule mask.

In some embodiments of the method, the portion of the content portion is a graphical object.

In some embodiments of the method, the portion of the content portion is a mix of text and at least one image.

In some embodiments of the method, the at least one images comprises one of: a picture, a map and a banner ad.

In some embodiments of the method, the rendering-instruction portion comprising HTML mark-up.

In some embodiments of the method, the at least one additional rendering command is configured to cause a change in appearance of the portion of the content portion to be modified from that of the at least one rendering command.

In some embodiments of the method, the at least one additional rendering command is configured to cause displaying of an auxiliary information not contained within the portion of the content portion to be modified.

In some embodiments of the method, auxiliary information is at least one of: an indication of an action to be executed with the an object; additional information associated with the content portion to be modified; a translated version of information contained in the content portion to be modified.

In some embodiments of the method, the at least one additional rendering command is configured to create a visual actuation area in association with the content portion to be modified, the visual actuation area displaying to a user an indication of an action, the method further comprising: in response to the user actuating the visual actuation area, executing the action.

In some embodiments of the method, acquiring the electronic document to be rendered comprises receiving the electronic document from a server, the server accessible by the electronic device via a communication network.

In some embodiments of the method, the receiving is executed in response to a user browsing activity.

In some embodiments of the method, acquiring the electronic document to be rendered comprises retrieving electronic document from a memory of the electronic device.

In some embodiments of the method, the generating at least one additional rendering command comprises retrieving an indication of a corresponding at least one additional rendering command from a command repository accessible to the electronic device.

In some embodiments of the method, the generating at least one additional rendering command comprises selecting the at least one additional rendering command from a set of additional rendering commands, the selecting based on the content portion to be modified.

According to another broad aspect of the present technology, there is provided an electronic device. The electronic device comprises: a processor; an input output module coupled to the processor, the processor being configured to: acquire an electronic document to be rendered, the electronic document comprising a content portion and a rendering-instruction portion, the rendering-instruction portion containing at least one instruction for enabling the processor to render the content portion on the input output module; generate at least one rendering command, at least one rendering command based on the at least one instruction; identify a portion of the content portion to be modified; based on the portion of the content portion to be modified generate, while generating at least one rendering command, at least one additional rendering command, the at least one additional rendering command not directly derivable from the at least one instruction; generate a screen-representation of the electronic document based on a combination of the at least one rendering command and the at least one additional rendering command.

In some embodiments of the electronic device, the portion of the content portion to be modified is a textual portion.

In some embodiments of the electronic device, to identify the portion of the content portion to be modified, the processor is configured to: identify a totality of text within the content portion; identify, within the totality of text, the textual portion to be modified.

In some embodiments of the electronic device, to identify, within the totality of text, the textual portion to be modified, the processor is configured to apply a rule mask.

In some embodiments of the electronic device, the portion of the content portion is a graphical object.

In some embodiments of the electronic device, the portion of the content portion is a mix of text and at least one image.

In some embodiments of the electronic device, the at least one images comprises one of: a picture, a map and a banner ad.

In some embodiments of the electronic device, the rendering-instruction portion comprising HTML mark-up.

In some embodiments of the electronic device, the at least one additional rendering command is configured to cause a change in appearance of the portion of the content portion to be modified from that of the at least one rendering command.

In some embodiments of the electronic device, the at least one additional rendering command is configured to cause displaying of an auxiliary information not contained within the portion of the content portion to be modified.

In some embodiments of the electronic device, auxiliary information is at least one of: an indication of an action to be executed with the an object; additional information associated with the content portion to be modified; a translated version of information contained in the content portion to be modified.

In some embodiments of the electronic device, the at least one additional rendering command is configured to create a visual actuation area in association with the content portion to be modified, the visual actuation area displaying to a user an indication of an action, and wherein in response to the user actuating the visual actuation area, the processor is configured to execute the action.

In some embodiments of the electronic device, to acquire the electronic document to be rendered, the processor is configured to receive the electronic document from a server, the server accessible by the electronic device via a communication network.

In some embodiments of the electronic device, the receiving is executed in response to a user browsing activity.

In some embodiments of the electronic device, to acquire the electronic document to be rendered, the processor is configured to retrieve electronic document from a memory module of the electronic device.

In some embodiments of the electronic device, to generate at least one additional rendering command, the processor is configured to retrieve an indication of a corresponding at least one additional rendering command from a command repository accessible to the electronic device.

In some embodiments of the electronic device, to generate at least one additional rendering command, the processor is configured to select, based on the content portion to be modified, the at least one additional rendering command from a set of additional rendering commands.

In the context of the present specification, unless expressly provided otherwise, a "server" is a computer program that is running on appropriate hardware and is capable of receiving requests (e.g. from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, unless expressly provided otherwise, "client device" is any computer hardware that is capable of running software appropriate to the relevant task at hand. Thus, some (non-limiting) examples of client devices include personal computers (desktops, laptops, netbooks, etc.), smartphones, and tablets. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, unless expressly provided otherwise, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the expression "component" is meant to include software (appropriate to a particular hardware context) that is both necessary and sufficient to achieve the specific function(s) being referenced.

In the context of the present specification, unless expressly provided otherwise, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless expressly provided otherwise, the expression "interactive" is meant to indicate that something is responsive to a user's input or that at least portions thereof are responsive to a user's input.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a file could include the file itself (i.e. its contents), or it could be a unique file descriptor identifying the file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Figure 1:
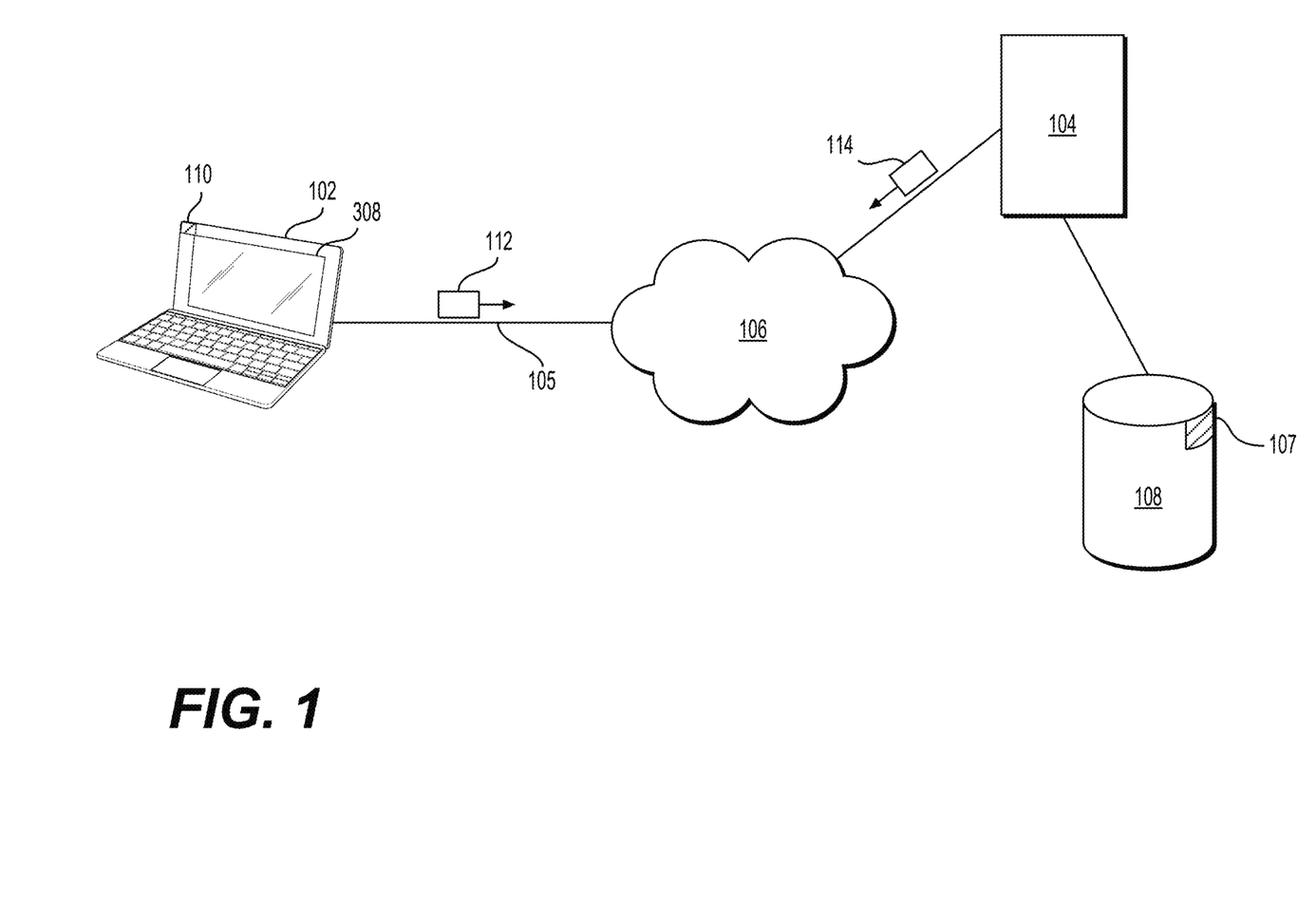
FIG. 1 depicts a schematic diagram of a system suitable for implementing embodiments of the present technology.

With reference to FIG. 1, there is depicted a schematic representation of a system 100, the system 100 being implemented in accordance with non-limiting embodiments of the present technology. The system 100 comprises an electronic device 102, the electronic device 102 being implemented in accordance with the non-limiting embodiments of the present technology. Within the illustration of FIG. 1, the electronic device 102 can be implemented as a wireless communication device (such as a cell phone, a smartphone, a tablet, a personal digital assistant and the like), a personal computer (desktops, laptops, netbooks, etc.), network equipment (a router, a switch, or a gateway) and the like. Generally speaking, teachings to be presented herein can be applied to any electronic device 102 that has a screen (whether built in or interfaced).

Figure 3:
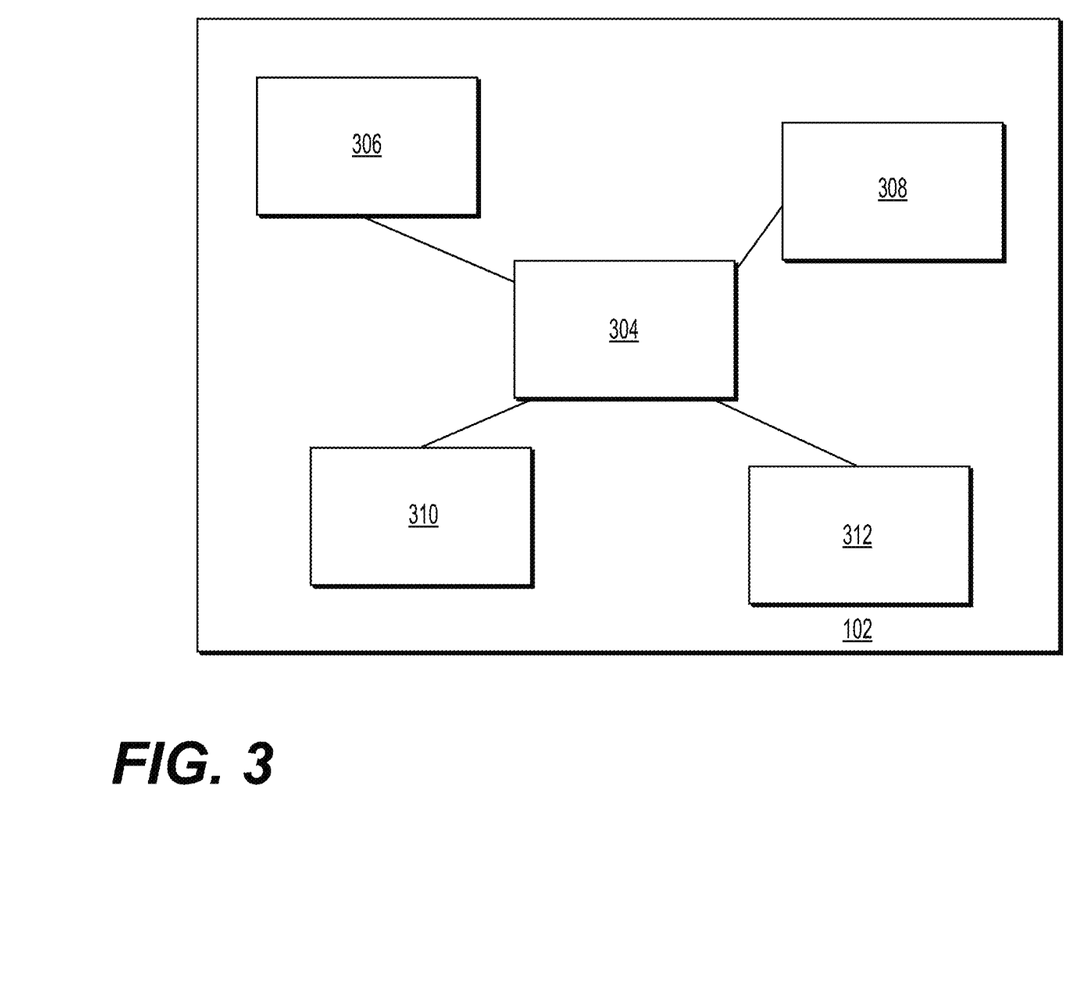
FIG. 3 is a schematic diagram of an electronic device of the system of FIG. 1, the electronic device being implemented in accordance with embodiments of the present technology.

With reference to FIG. 3, there is depicted a schematic diagram of the electronic device 102. It should be noted that the description of the electronic device 102 to be presented will be greatly simplified and focused on pertinent components for executing embodiments of the present technology, but one of ordinary skill in the art will easily appreciate other components of the electronic device 102 and their associated functionality.

The electronic device 102 comprises a processor 304. In a particular embodiment, the processor 304 may comprise one or more processors and/or one or more microcontrollers configured to execute instructions and to carry out operations associated with the operation of the electronic device 102. In various embodiments, processor 304 may be implemented as a single-chip, multiple chips and/or other electrical components including one or more integrated circuits and printed circuit boards. Processor 304 may optionally contain a cache memory unit (not depicted) for temporary local storage of instructions, data, or computer addresses. By way of example, the processor 304 may include one or more processors or one or more controllers dedicated for certain processing tasks of the electronic device 102 or a single multi-functional processor or controller.

The processor 304 is coupled to a memory module 306. The memory module 306 may encompass one or more storage media and generally provide a place to store computer code (e.g., software and/or firmware). By way of example, the memory module 306 may include various tangible computer-readable storage media including Read-Only Memory (ROM) and/or Random-Access Memory (RAM). As is well known in the art, ROM acts to transfer data and instructions uni-directionally to the processor 304, and RAM is used typically to transfer data and instructions in a bi-directional manner.

Memory module 306 may also include one or more fixed storage devices in the form of, by way of example, hard disk drives (HDDs), solid-state drives (SSDs), flash-memory cards (e.g., Secured Digital or SD cards, embedded Multi-MediaCard or eMMD cards), among other suitable forms of memory coupled bi-directionally to the processor 304. Information may also reside on one or more removable storage media loaded into or installed in the electronic device 102 when needed. By way of example, any of a number of suitable memory cards (e.g., SD cards) may be loaded into the electronic device 102 on a temporary or permanent basis.

The memory module 306 may store inter alia a series of computer-readable instructions, which instructions when executed cause the processor 304 (as well as other components of the electronic device 102) to execute the various operations described herein.

The processor 304 is further coupled to a communication interface 308 for a two-way communication with a communication network 106 (depicted in FIG. 1).

The processor 304 is further coupled to an input output module 310 (which can also be referred to from time to time as a display 310). Input output module 310 may comprise one or more input and output devices. For example, input output module 310 may include keyboard, mouse, one or more buttons, thumb wheel, and/or display (e.g., liquid crystal display (LCD), light emitting diode (LED), Interferometric modulator display (IMOD), or any other suitable display technology).

Generally, the input portion of the input output module 310 is configured to transfer data, commands and responses from the outside world into the electronic device 102. The output portion of the input output module 310 is generally configured to display a graphical user interface (GUI) that provides an easy to use visual interface between a user of the electronic device 102 and the operating system or application(s) running on the electronic device 102. Generally, the GUI presents programs, files and operational options with graphical images During operation, the user may select and activate various graphical images displayed on the display in order to initiate functions and tasks associated therewith.

In the depicted embodiment of the electronic device 102 of FIG. 1, the input output module 310 is implemented as a separate screen and a separate keyboard. In additional embodiments, the input output module 310 can be implemented as a touch screen, which implements functionality of both an input device (by means of acquiring user's touch based commands) and an output device (i.e. a screen). In other words, the touch screen is a display that detects the presence and location of user touch-based inputs. In yet alternative embodiments, the input output module 310 can include a physical interface (including one or more physical buttons) in addition to the touch screen.

The processor 304 is further coupled to a renderer 312. Generally speaking, the renderer 312 is configured to execute rendering, i.e. generating a rendered image of a document to display on the input output module 310. The renderer 312 is configured to process rendering instructions associated with a particular document to generate rendering commands for the input output module 310, as will be described in greater detail herein below.

Even though the renderer 312 is depicted as a hardware module within the illustration of FIG. 3, in alternative implementations, the renderer 312 can be executed as a software module or a combination of hardware and software implementations.

Returning to the description of FIG. 1, the communication interface 308 of the electronic device 102 is configured to connect to the communication network 106 via a communication link 105. How the communication link 105 is implemented is not particularly limited and will depend on how the electronic device 102 is implemented. Merely as an example and not as a limitation, in those embodiments of the present technology where the electronic device 102 is implemented as a wireless communication device (such as a smartphone), the communication link 105 can be implemented as a wireless communication link (such as but not limited to, a 3G communication network link, a 4G communication network link, Wireless Fidelity, or WiFi® for short, Bluetooth® and the like). In those examples where the electronic device 102 is implemented as a notebook computer, the communication link can be either wireless (such as Wireless Fidelity, or WiFi® for short, Bluetooth® or the like) or wired (such as an Ethernet based connection).

In some non-limiting embodiments of the present technology, the communication network 106 can be implemented as the Internet. In other embodiments of the present technology, the communication network 106 can be implemented differently, such as any wide-area communication network, local-area communication network, a private communication network and the like.

Also coupled to the communication network 106 is a server 104. The server 104 can be implemented as a conventional computer server. In an example of an embodiment of the present technology, the server 104 can be implemented as a Dell™ PowerEdge™ Server running the Microsoft™ Windows Server™ operating system. Needless to say, the server 104 can be implemented in any other suitable hardware and/or software and/or firmware. In the depicted non-limiting embodiments of the present technology, the server 104 is a single server. In alternative non-limiting embodiments of the present technology, the functionality of the server 104 may be distributed and may be implemented via multiple servers.

Within embodiments of the present technology, the server 104 hosts one or more network-accessible resources, depicted in FIG. 1 as a network-accessible resource 107. To that end, the server 104 has access to (or comprises) a server storage 108. The server storage 108 can be implemented as any suitable memory device, which memory device can store one or more network-accessible resource 107.

The network-accessible resource 107 can be a web page, a web site or a web portal accessible by the electronic device 102 via the communication network 106. To that end, the electronic device 102 can execute a browser application 110 which allows a user (not depicted) of the electronic device 102 to request and receive content of the network-accessible resource 107. The user of the electronic device 102 can use the browser application 110 to enter (or copy-paste) a Universal Resource Locator (URL) or other suitable address associated with the network-accessible resource 107. Alternatively, the user can select a link that points to the URL of the network-accessible resource 107 (the selecting can be done from an electronic message, another web document, a text document or the like).

In response to the user requesting access to the network-accessible resource 107, the electronic device 102 transmits a packet 112 towards the server 104. How the packet 112 is processed by the communication network 106 and various network equipment contained therein (not depicted) is known in the art and will not be explained here at any length. Upon receipt of the packet 112, the server 104 processes the request contained therein and transmits a packet 114, the packet 114 containing the network-accessible resource 107. Naturally, each of the packet 112 and the packet 114 can comprise a respective plurality of packets containing the respective information.

Figure 2:
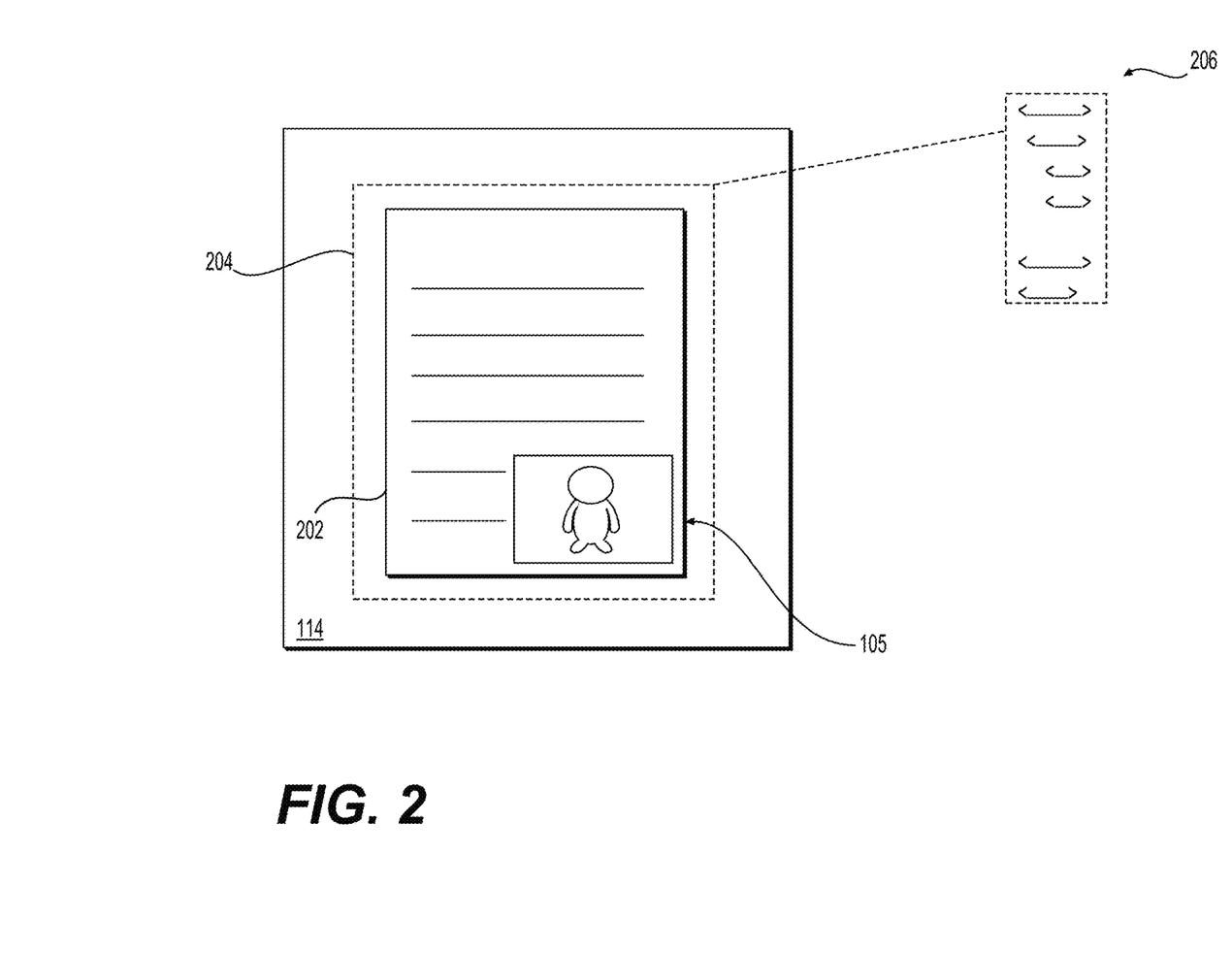
FIG. 2 depicts a schematic diagram of a document, the document to be displayed by an electronic device of the system of FIG. 1, the document having a text portion and a rendering portion.

With reference to FIG. 2, content of the packet 114 will be described in greater detail. FIG. 2 depicts a schematic diagram of the packet 114, which can be used for implementing embodiments of the present technology.

As has been alluded to above, the packet 114 contains the network-accessible resource 107. In order to enable the electronic device 102 to render the network-accessible resource 107 visible to the user of the electronic device 102, the network-accessible resource 107 contains a content portion 202 and a rendering-instruction portion 204. The content portion 202 contains one or more of text, graphics and the like that are to be displayed to the user of the electronic device 102. The rendering-instruction portion 204 contains at least one instruction 206 for enabling the electronic device 102 to render the content portion 202 on the input output module 310.

In some embodiments of the present technology, the rendering-instruction portion 204 can be implemented as HyperText Markup Language (HTML). However, embodiments of the present technology presented herein are not limited to HTML being the implementation for the rendering-instruction portion 204. As such, the rendering-instruction portion 204 can be implemented as one of: Keyhole Markup Language (KML/KMZ), Mathematical Markup Language (MathML), Scalable Vector Graphics (SVG), TeX, LaTeX, Wild markup, Extensible 3D (X3D), Extensible HyperText Markup Language (XHTML) and the like.

Upon receipt of the packet 114, the processor 304 of the electronic device 102 passes the content portion 202 and the rendering-instruction portion 204 to the renderer 312 for rendering the content portion 202 using the input output module 310.

Figure 4:
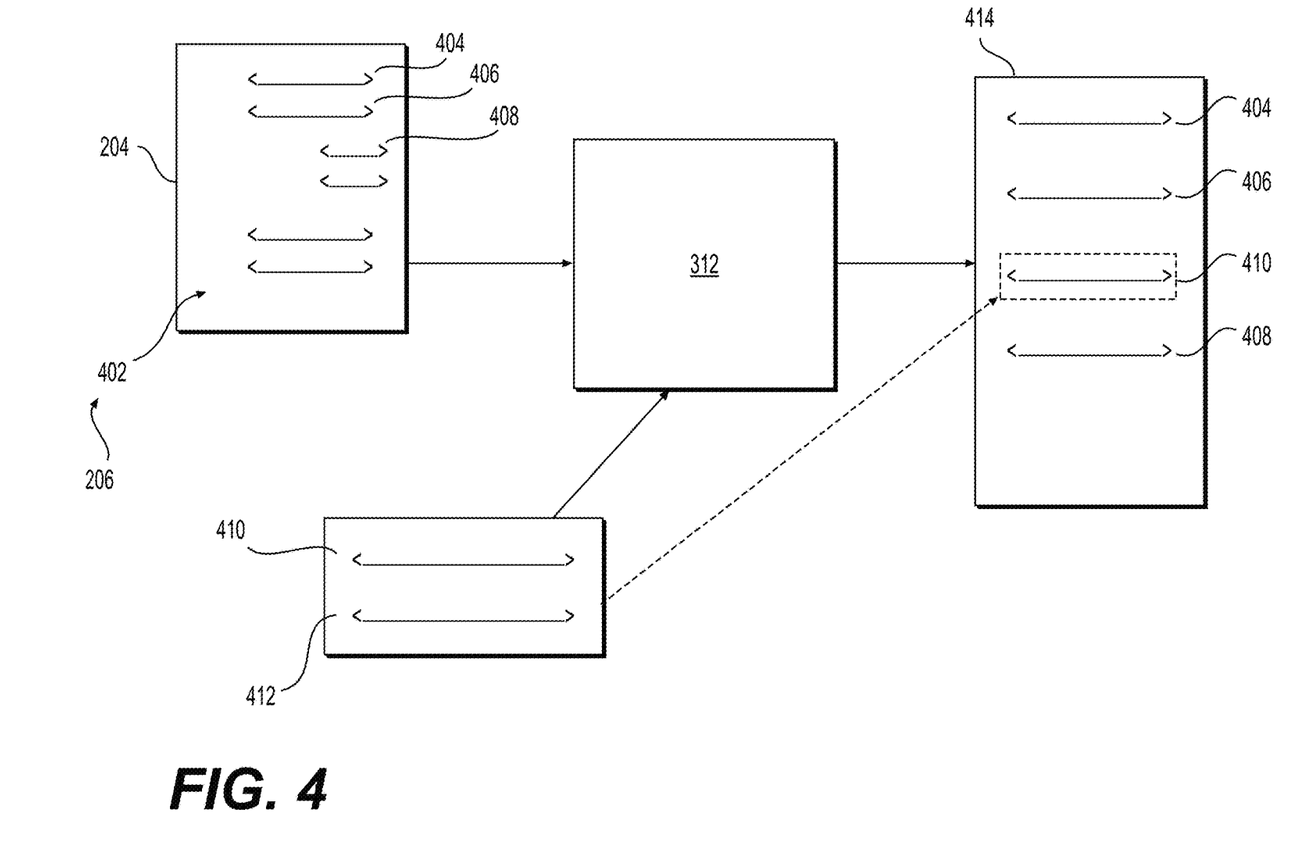
FIG. 4 is a schematic representation of a process for generating rendering instruction by a renderer of the electronic device of FIG. 3, the generating rendering instructions being executed based on instructions coming from two sources.
Figure 5:
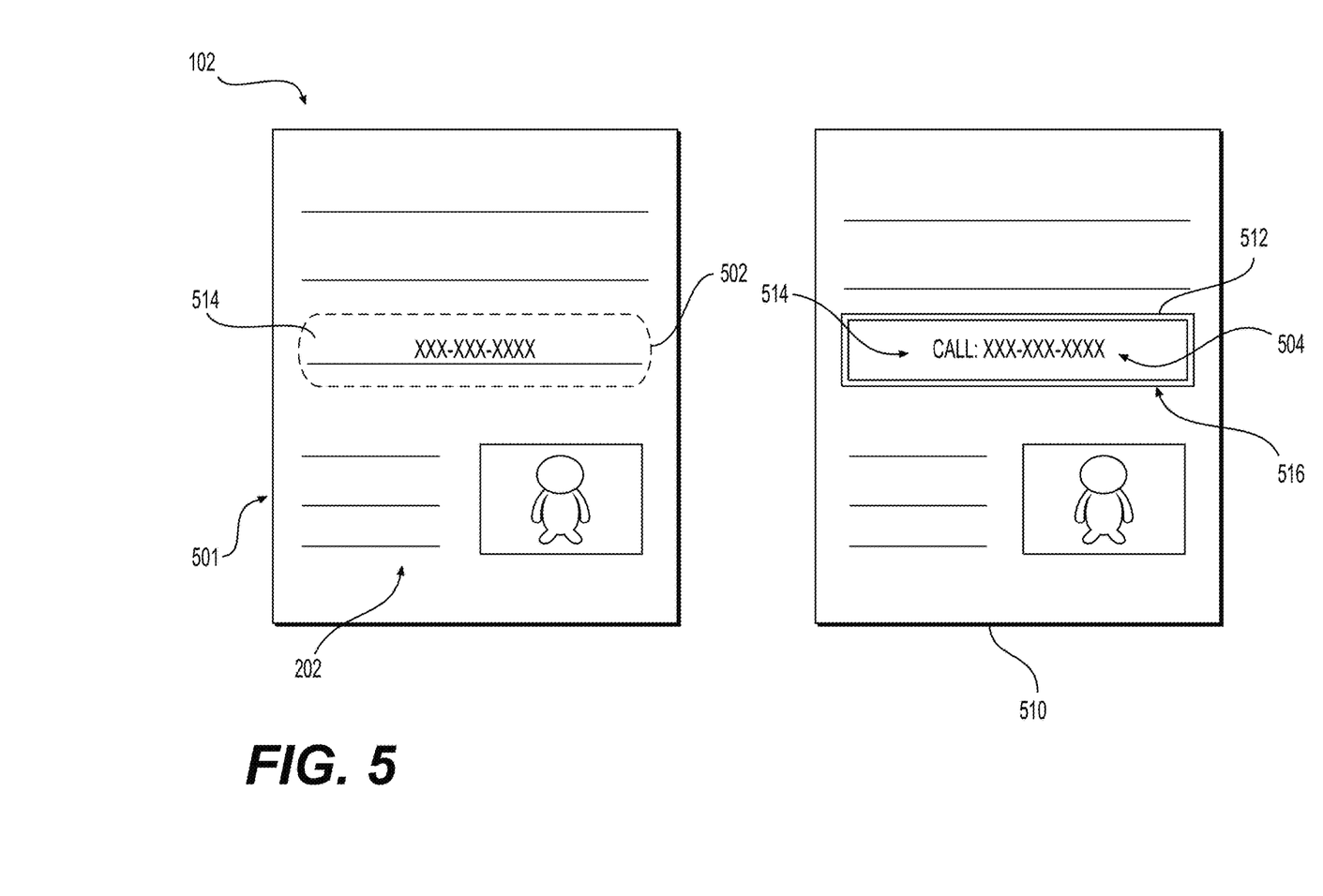
FIG. 5 depicts a schematic representation of a first rendered document and a second rendered document, the first rendered document having been rendered using prior art techniques and the second rendered document having been rendered using embodiments of the present technology.

The process of rendering will be described with reference to FIG. 4 and FIG. 5, in which FIG. 4 is a schematic representation of a process for generating a rendering instruction by the renderer 312 of the electronic device 102 of FIG. 3, the generating rendering instructions being executed based on instructions coming from two sources and FIG. 5 depicts a schematic representation of a first rendered document and a second rendered document, the first rendered document having been rendered using prior art techniques and the second rendered document having been rendered using embodiments of the present technology.

It is noted that the description to be presented herein will be using the network-accessible resource 107 as an example only. However, it should be expressly understood that teachings presented herein are equally applicable to any resource or document, whether it is accessible via the communication network 106 or stored locally on the memory module 306 or otherwise available to the electronic device 102 (for example, via an external memory storage or the like).

First, the process of the renderer 312 rendering the content portion 202 using the rendering-instruction portion 204 will be described. The rendering-instruction portion 204 contains the aforementioned at least one instruction 206, the at least one instruction 206 being depicted as a plurality of rendering instructions 402, including a first rendering instruction 404, a second rendering instruction 406, a third rendering instruction 408, as well as a number of other rendering instructions, which are not numbered in FIG. 4.

Each of the first rendering instruction 404, the second rendering instruction 406 and the third rendering instruction 408 is processed by the renderer 312 to cause displaying an associated portion of a first rendered page 501, depicted in FIG. 5. As an example only, a given one of the first rendering instruction 404, the second rendering instruction 406 and the third rendering instruction 408 can be associated with a particular portion of the first rendered page 501, such as a portion of a text, an image or any other suitable object. Furthermore, the given one of the first rendering instruction 404, the second rendering instruction 406 and the third rendering instruction 408 further outlines to the renderer 312 a placement of the associated portion of the first rendered page 501, as well as other parameters (such, as for the text as an example, color, font, size, bold or italic rendering and the like).

Let it be assumed that the second rendering instruction 406 is associated with rendering a telephone number to be displayed within the first rendered page 501 (this is depicted at 504 in FIG. 5 as a telephone number XXX-XXX-XXXX). Naturally, the telephone number is used as an example only and, as such, teachings to be presented herein below can be applied to any text, any image or any other object within the first rendered page 501. Broadly speaking, the teachings to be presented herein can be applied to any type of a portion within the content portion 202, such as a text or a graphical object or a mix of text and at least one graphical object. The graphical object can be any image and may include a picture, a map and a banner ad.

According to embodiments of the present technology, the renderer 312 is configured to analyze the content of the content portion 202 to determine at least one portion of the content portion 202 to be modified for a visually different rendering that that prescribed by the rendering-instruction portion 204. How the renderer 312 executes the identifying of at least one portion to be modified can vary in various embodiments of the present technology.

In some embodiments of the present technology, the portion to be modified can be an image, such as a map or a banner ad. In those embodiments, the renderer can identify the at least one portion to be modified using a pre-defined rule and applying the pre-defined rule to the rendering instructions within the rendering-instruction portion 204. As an example, where the rendering-instruction portion 204 is implemented as HTML, the renderer 312 can analyze the HTML tags to identify <img src= . . . > tags and identify an object associated therewith as at least one portion of the content portion 202 to be modified.

In other embodiments of the present technology, the portion to be modified can be a text portion. Within these embodiments of the present technology, identifying at least one portion of the content portion 202 to be modified can include: (i) identifying a totality of text within the content portion 202; (ii) identifying, within the totality of text, the textual portion to be modified. The renderer 312 is configured to first extract all text from the content portion 202, which can be done for example by retrieving text only portions from the content portion 202. The renderer 312 can be further configured to apply at least one predefined rule and an associated mask to the so-retrieved totality of text from within the content portion 202.

In some embodiments of the present technology, the at least one predefined rule can be to highlight a telephone number within the content portion 202 and the associated mask can be "###-###-####", the mask being configured to identify North American standard phone numbers.

In other embodiments, the at least one predefined rule can be to highlight an address within the content portion 202 and the associated mask can be "<any text><#?##?#>", the mask being configured to identify a Canadian standard postal code. The renderer 312 can further apply at least one rule to identify the text around the identified postal code to identify the remainder of the address. This can also involve applying one or more additional masks for identifying the house number, street name, municipality, province/state and the like.

In the illustration of FIG. 5, the process of identifying the at least one portion of the content portion 202 to be modified is schematically depicted at 502. In this illustration, the renderer 312 has identified the telephone number depicted at 504 as a portion of the content portion 202 to be modified, this identification being depicted in dotted lines at 502.

The renderer 312 can additionally generate at least one additional rendering instruction to be applied to the so-identified at least one portion of the content portion 202 to be modified. It should be noted that the at least one additional rendering command is not directly derivable from the at least one instruction contained within the rendering-instruction portion 204. In other words, the at least one additional rendering instruction command is configured to change rendering of the at least one portion of the content portion 202 to be modified from the way it would have been rendered if the instructions within the rendering-instruction portion 204 to be followed (as was the case with the first rendered page 501 of FIG. 5, for example).

In some embodiments of the present technology, the renderer 312 is configured to retrieve the at least one additional rendering instruction from the memory module 306, the memory module 306 being configured to store an indication of the at least one additional instruction in association with a respective pre-defined rule for identifying and amending at least one portion of the content portion 202. These are depicted in FIG. 4—as a first additional rendering instruction 410 and a second additional rendering instruction 412. Let it be assumed that the first rendering instruction 410 is associated with the first predefined rule for highlighting a telephone number and augmenting it appearance into an actuatable phone number, which the user of the electronic device 102 can "click" to initiate a VoIP call to. Additionally, let it be assumed that the second rendering instruction 412 is associated with the second predefined rule for changing appearance of an address within the content portion 202, the changed appearance of the address being indicative of a map being available, when the user "hovers over" the address displayed in a modified visual appearance.

As such, it can be said that the renderer 312 generates the at least one additional rendering command based on a type of the portion of the content portion 202 to be modified.

The renderer 312 is configured while generating the at least one rendering command from the rendering-instruction portion 204 to generate the at least one additional rendering instruction 410, 412 and, therefore, generate a complete set of rendering commands 414, depicted in FIG. 4. As should become clear from the description presented above, the complete set of rendering commands 414 is based on instructions derived from the plurality of rendering instructions 402 (i.e. those that are derived form the rendering-instruction portion 204) and at least one additional rendering instruction 410, 412, the at least one additional rendering instruction 410, 412 not directly derivable from the plurality of rendering instructions 402 contained in the rendering-instruction portion 204, but rather having been generated based on the identified portion of the content portion 202 to be modified.

As depicted in FIG. 4, the complete set of rendering commands 414 comprises, in order, rendering commands based on: the first rendering instruction 404 and the second rendering instruction 406 from the plurality of rendering instructions 402 of the rendering-instruction portion 204, then the first additional rendering instruction 410 that is not directly derivable from the plurality of rendering instructions 402, followed by the third rendering instruction 408 from the plurality of rendering instructions 402, followed by a number of other rendering commands based on rendering instructions derived from the plurality of rendering instructions 402 (as well as potentially one or more additional rendering instructions similar to the additional rendering instructions 410, 412).

With reference to FIG. 5, a second rendered page 510 is depicted, the second rendered page 510 having been rendered using the process that was described with reference to FIG. 4. The second rendered page 510 is substantially similar to the first rendered page 501 (insofar that the second rendered page 510 has been rendered using the same rendering instructions as the first rendered page 501), other than specific differences discussed above. As will be recalled portions of the second rendered page 510 have been rendered using the additional rendering instruction 410. It will also be recalled that the additional rendering instruction 410 is configured to augment presentation of a telephone number (i.e. XXX-XXX-XXXX depicted at 504 in FIG. 5).

Within the illustration of the second rendered page 510, an augmented rendered presentation 516 of the phone number XXX-XXX-XXXX is depicted. The exact extend of the augmentation of the presentation is not limited and will depend on the specific implementation of the present technology.

For example, in some embodiments of the present technology, the augmented presentation can include an indication of an action 514. In the illustration of FIG. 5, the indication of the action 514 reads "Call" to indicate to the user of the electronic device 102 that the user can initiate a VoIP call by clicking (or otherwise actuating) the augmented rendered presentation 516.

In alternative embodiments, the indication of the action 514 can comprise a different text, which will naturally depend on the type of the portion of the content portion 202 that is being modified. For example, the indication of the action 514 can read "Display on a map:", "Send an e-mail:", "Download the file:", "Start streaming:", "Start downloading:", "Play media:" and the like.

It is noted that the indication of the action 514 can be presented in a form of text, in a form of a graphical object or a combination of text and graphical objects.

In addition or instead of the indication of the action 514, the augmented rendered presentation 516 can include a modification to an appearance 512 of the phone number XXX-XXX-XXXX. In the depicted illustration of FIG. 5, the modification to the appearance 512 includes a double border drawn around the phone number XXX-XXX-XXXX. However, it should be expressly understood that such is provided for illustration purposes only. As such, some examples of the possible modifications of the appearance 512 can include but are not limited to:

For text
   modified type font
   modified presentation (ex. bold, italic or underlined)
   modified color
   modified size of the font
For images
   a border drawn around the image
   a replacement image displayed over the image to be modified
   blurring of the image to be modified
   replacing the image to be modified with the same image of a different resolution or the like It should be understood that the augmented rendered presentation 516 is not limited to the examples provided above. As such, the augmented rendered presentation 516 may include an augmented presentation of the portion of the content portion 202 to be modified, as well as in addition or instead of augmenting the presentation of the portion of the content portion 202 to be modified, the augmented rendered presentation 516 can also include incorporation auxiliary information to be presented together with (or instead of) the portion of the content portion 202 to be modified. In other words, the at least one additional rendering instruction 410, 412 can be configured to cause displaying of an auxiliary information not contained within the portion of the content portion 202 to be modified. In other words, the auxiliary information is the information that would not have been displayed if the rendering was executed using the rendering-instruction portion 204 (as is the case with the first rendered page 501).

Within various embodiments of the present technology, the auxiliary information may include but is not limited to:
   an indication of an action to be executed with the object presented within the portion of the content portion 202 to be modified (as the above example of the indication of the action 514);
   additional information associated with the content portion to be modified (such as an exchange rate for foreign currency, a translated version of information contained in the content portion to be modified, definition of a term contained in the content portion to be modified and the like).

The augmented rendered presentation 516 can be displayed together with the portion of the content portion 202 to be modified, instead of the portion of the content portion 202 to be modified or upon the user executing an action with the portion of the content portion 202 to be modified. The illustration of the second rendered page 510 is an example of the augmented rendered presentation 516 being displayed together and in addition to the original content of the portion of the content portion 202 to be modified. In alternative examples, the augmented rendered presentation 516 can be displayed upon the user hovering a cursor (or otherwise actuating) the portion of the content portion 202 to be modified. In yet other embodiments, a portion of the augmented rendered presentation 516 can be displayed together with the portion of the content portion 202 to be modified and another portion of the augmented rendered presentation 516 can be displayed upon the user actuating the portion of the content portion 202 and/or the displayed first portion of the augmented rendered presentation 516.

Given the architecture described above, as well as various examples depicted above, it is possible to execute a method for rendering a screen-representation of an electronic document. The electronic document can be the network-accessible resource 107. Alternatively, the electronic document can be a locally stored document (i.e. the document stored on the memory module 306).

Figure 6:
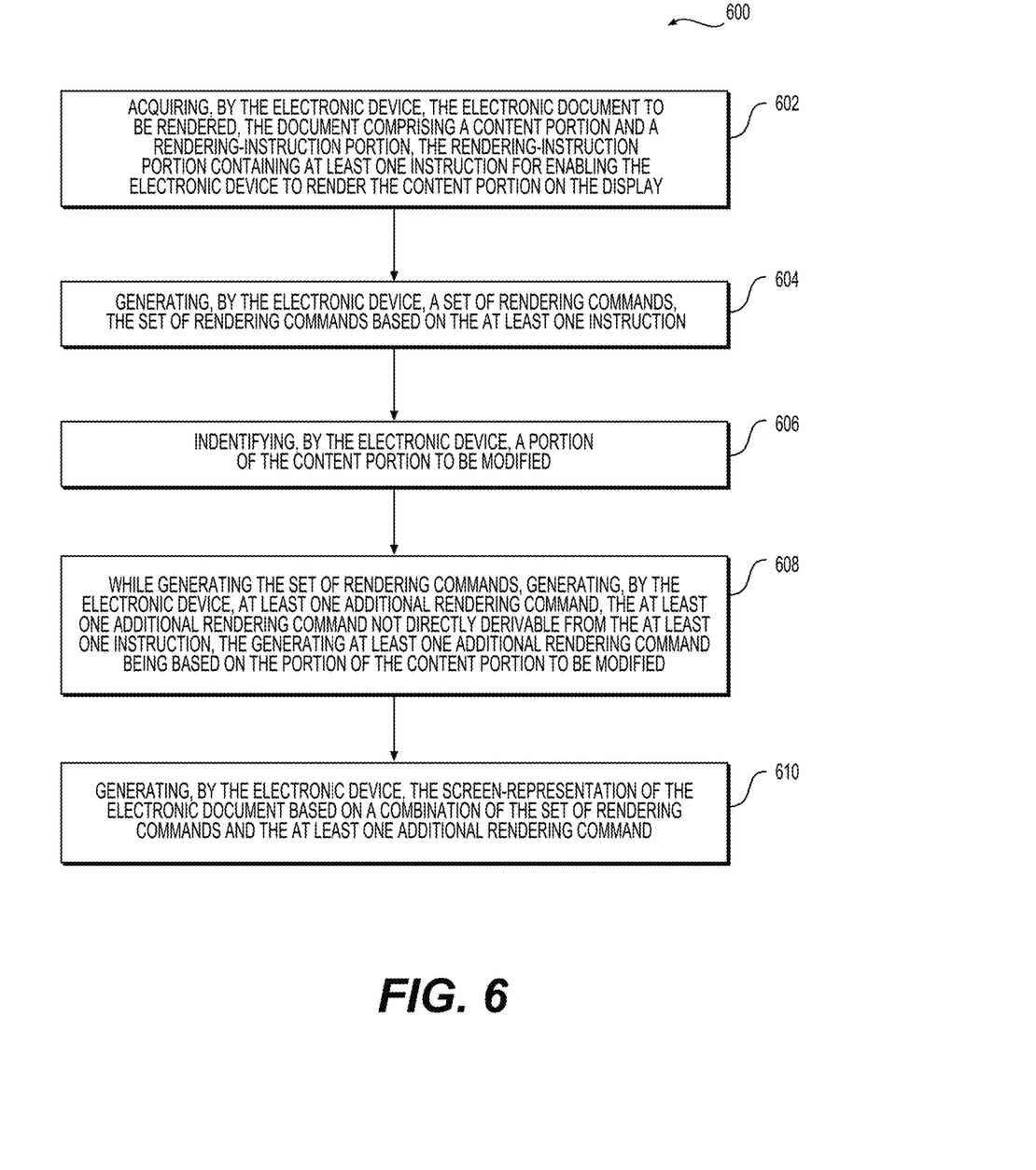
FIG. 6 depicts a flow chart of a method, the method implemented within the electronic device of FIG. 3, the method being implemented in accordance with the non-limiting embodiments of the present technology.

With reference to FIG. 6, there is depicted a block diagram of a method 600, the method 600 being implemented in accordance with non-limiting embodiments of the present technology. The method 600 can be executed on the electronic device 102. More specifically, the method 600 can be executed by the renderer 312 of the electronic device 102. In alternative embodiments, parts of the method 600 can be executed on a network device, such as the server 104.

Step 602—acquiring, by the electronic device, the electronic document to be rendered, the electronic document comprising a content portion and a rendering-instruction portion, the rendering-instruction portion containing at least one instruction for enabling the electronic device to render the content portion on the display The method 600 starts at step 602, where the electronic device 102 acquires the electronic document 107 to be rendered, the electronic document 107 comprising the content portion 202 and the rendering-instruction portion 204, the rendering-instruction portion 204 containing at least one instruction 206 for enabling the electronic device 102 to render the content portion 202 on the display 310.

In some embodiments of the method 600, the rendering-instruction portion 204 comprises HTML mark-up. However, it should be understood that any examples of the mark-up languages provided above, as well as any other suitable type of rendering instruction portion can be used within alternative embodiments of the present technology.

In some embodiments of the method 600, the step of acquiring the electronic document to be rendered comprises receiving the electronic document 107 from the server 104, the server 104 accessible by the electronic device 102 via the communication network 106. In some embodiments of the present technology, the receiving is executed in response to a user browsing activity, for example, by using the browser application 110.

In other embodiments of the method 600, the step of acquiring the electronic document to be rendered comprises retrieving the electronic document from the memory module 306 of the electronic device 102.

Step 604—generating, by the electronic device, at least one rendering command, the at least one rendering command based on the at least one instruction Next, at step 604, the electronic device 102 generates at least one rendering command 414, the at least one rendering command 414 based on the at least one instruction 206.

Step 606—identifying, by the electronic device a portion of the content portion to be modified Next, at step 606, the electronic device 102 identifies a portion of the content portion 202 to be modified.

In some embodiments of the present technology, the identification of the portion of the content portion 202 to be modified is executed by analyzing the rendering-instruction portion 204 and by applying at least one predetermined rule to identify the portion of the content portion 202 to be modified.

In some embodiments of the method 600, the portion of the content portion to be modified is a textual portion. In those embodiments, the step of identifying the portion of the content portion to be modified comprises: identifying a totality of text within the content portion; identifying, within the totality of text, the textual portion to be modified. The identifying, within the totality of text, the textual portion to be modified comprises applying, by the electronic device 102, a rule mask to the totality of text.

In alternative implementations of the method 600, the portion of the content portion is a graphical object or a mix of text and at least one image. The at least one images can comprise one of: a picture, a map and a banner ad.

Step 608—while generating the at least one rendering command, generating, by the electronic device, at least one additional rendering command, the at least one additional rendering command not directly derivable from the at least one instruction, the generating at least one additional rendering command being based on the portion of the content portion to be modified Next, at step 608, the electronic device 102, while generating the at least one rendering command 414, also generates at least one additional rendering instruction 410, 412, the at least one additional rendering instruction 410, 412 not directly derivable from the at least one instruction 206, the generating at least one additional rendering instruction 410, 412 being based on the portion of the content portion 202 to be modified.

As has been alluded to above, the at least one additional rendering instruction 410, 412 is configured to cause a change in appearance of the portion of the content portion 202 to be modified from that of the at least one rendering instruction 206.

In some embodiments of the present technology, the at least one additional rendering instruction 410, 412 is configured to cause displaying of an auxiliary information not contained within the portion of the content portion 202 to be modified (i.e. not contained in the portion of the content portion 202 if it were to be rendered based on the at least one rendering instruction 206). The auxiliary information can be at least one of: an indication of an action to be executed with the an object; additional information associated with the content portion to be modified; a translated version of information contained in the content portion to be modified.

In some embodiments of the method 600, the step of generating at least one additional rendering instruction 410, 412 comprises retrieving an indication of a corresponding at least one additional rendering instruction 410, 412 from a command repository accessible to the electronic device 102. The command repository can be stored on the memory module 306. Alternatively, the command repository can be stored remotely and accessible via the communication network 106.

In some embodiments of the method 600, the step of generating at least one additional rendering instruction 410, 412 comprises selecting the at least one additional rendering instruction 410, 412 from a set of additional rendering instructions 410, 412, the selecting based on the content portion to be modified.

Step 610—generating, by the electronic device, the screen-representation of the electronic document based on a combination of the at least one rendering command and the at least one additional rendering command Next, at step 610, the electronic device 102 generates the screen-representation 510 of the electronic document 107 based on a combination of the at least one rendering instruction 206 and the at least one additional rendering instruction 410, 412 (i.e. based on the complete at least one rendering command 414).

In some embodiments of the method 600, the at least one additional rendering instruction 410, 412 is configured to create a visual actuation area in association with the content portion to be modified, the visual actuation area displaying to a user an indication of an action and the method 600 can further comprise, in response to the user actuating the visual actuation area, executing the action.

A technical effect of embodiments of the present technology may include ability to augment presentation of any document irrespective of how its rendering-instruction portion 204 is implemented. In other words, embodiments of the present technology allow rendering modification of a document irrespective of how the rendering-instruction portion 204 is implemented. Embodiments of the present technology may have another technical effect, which allows rendering modification of the document without modifying rendering instructions contained in the rendering-instruction portion 204, but rather by adding additional rendering instructions and, therefore, avoiding causing the rendering instruction contained in the rendering-instruction portion 204 from being rendered inoperative and, therefore, avoiding wrong rendering of the document.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

As such, embodiments of the present technology can be described as follows, structured as numbered clauses.

CLAUSE 1. A method (600) of rendering a screen-representation (510) of an electronic document (107), the method (600) executed on an electronic device (102), the electronic device (102) having a display (310), the method (600) comprising:
  acquiring (602), by the electronic device (102), the electronic document (107) to be rendered, the electronic document comprising a content portion (202) and a rendering-instruction portion (204), the rendering-instruction portion (204) containing at least one instruction (206) for enabling the electronic device (102) to render the content portion (202) on the display (310);
  generating (604), by the electronic device (102), at least one rendering command (414), at least one rendering command (414) based on the at least one instruction (206),
  identifying (606), by the electronic device (102), a portion of the content portion (202) to be modified;
  while generating (604) at least one rendering command, generating (606), by the electronic device (102), at least one additional rendering command (414), the at least one additional rendering command (414) not directly derivable from the at least one instruction (206), the generating (606) at least one additional rendering command (414) being based on the portion of the content portion (202) to be modified;

generating (608), by the electronic device (102), the screen-representation (510) of the electronic document (107) based on a combination of the at least one rendering command (414) and the at least one additional rendering command (414).

CLAUSE 2. The method (600) of clause 1, wherein the portion of the content portion (202) to be modified is a textual portion.

CLAUSE 3. The method (600) of clause 2, wherein the identifying the portion of the content portion to be modified comprises:
identifying a totality of text within the content portion;
identifying, within the totality of text, the textual portion to be modified.

CLAUSE 4. The method (600) of clause 3, wherein the identifying, within the totality of text, the textual portion to be modified comprises applying a rule mask.

CLAUSE 5. The method (600) of clause 1, wherein the portion of the content portion (202) is a graphical object.

CLAUSE 6. The method (600) of clause 1, wherein the portion of the content portion (202) is a mix of text and at least one image.

CLAUSE 7. The method (600) of clause 6, wherein the at least one images comprises one of: a picture, a map and a banner ad.

CLAUSE 8. The method (600) of clause 1, the rendering-instruction portion (204) comprising HTML mark-up.

CLAUSE 9. The method (600) of clause 1, wherein the at least one additional rendering command (414) is configured to cause a change in appearance of the portion of the content portion (202) to be modified from that of the at least one rendering command (404, 416, 408).

CLAUSE 10. The method (600) of clause 1, wherein the at least one additional rendering command (414) is configured to cause displaying of an auxiliary information not contained within the portion of the content portion (202) to be modified.

CLAUSE 11. The method (600) of clause 10, wherein auxiliary information is at least one of:
an indication of an action to be executed with the an object;
additional information associated with the content portion to be modified;
a translated version of information contained in the content portion to be modified.

CLAUSE 12. The method (600) of clause 1, wherein the at least one additional rendering command (414) is configured to create a visual actuation area in association with the content portion (202) to be modified, the visual actuation area displaying to a user an indication of an action, the method (600) further comprising: in response to the user actuating the visual actuation area, executing the action.

CLAUSE 13. The method (600) of clause 1, wherein acquiring the electronic document (107) to be rendered comprises receiving the electronic document (107) from a server (104), the server (104) accessible by the electronic device (102) via a communication network (106).

CLAUSE 14. The method (600) of clause 12, wherein the receiving is executed in response to a user browsing activity.

CLAUSE 15. The method (600) of clause 1, wherein acquiring the electronic document (107) to be rendered comprises retrieving electronic document (107) from a memory module (306) of the electronic device (102).

CLAUSE 16. The method (600) of clause 1, wherein the generating at least one additional rendering command (414) comprises retrieving an indication of a corresponding at least one additional rendering command (414) from a command repository accessible to the electronic device (102).

CLAUSE 17. The method (600) of clause 1, wherein the generating at least one additional rendering command (414) comprises selecting the at least one additional rendering command (410, 412) from a set of additional rendering commands (410, 412), the selecting based on the content portion (202)*to* be modified.

CLAUSE 18. An electronic device (102) comprising:
a processor (304);
an input output module (310) coupled to the processor (304),
the processor (304) being configured to:
acquire an electronic document (107) to be rendered, the electronic document (107) comprising a content portion (202) and a rendering-instruction portion (204), the rendering-instruction portion (204) containing at least one instruction (206) for enabling the processor (304) to render the content portion (202) on the input output module (310);
generate at least one rendering command (414), at least one rendering command (414) based on the at least one instruction (206);
identify a portion of the content portion (202) to be modified;
based on the portion of the content portion (202) to be modified generate, while generating at least one rendering command, at least one additional rendering command (414), the at least one additional rendering command (414) not directly derivable from the at least one instruction (206);
generate a screen-representation (510) of the electronic document (107) based on a combination of the at least one rendering command (414) and the at least one additional rendering command (414).

CLAUSE 19. The electronic device (102) of clause 18, wherein the portion of the content portion (202) to be modified is a textual portion.

CLAUSE 20. The electronic device (102) of clause 19, wherein to identify the portion of the content portion to be modified, the processor (304) is configured to:
identify a totality of text within the content portion (202);
identify, within the totality of text, the textual portion to be modified.

CLAUSE 21. The electronic device (102) of clause 20, wherein to identify, within the totality of text, the textual portion to be modified, the processor (304) is configured to apply a rule mask.

CLAUSE 22. The electronic device (102) of clause 18, wherein the portion of the content portion (202) is a graphical object.

CLAUSE 23. The electronic device (102) of clause 18, wherein the portion of the content portion (202) is a mix of text and at least one image.

CLAUSE 24. The electronic device (102) of clause 23, wherein the at least one images comprises one of: a picture, a map and a banner ad.

CLAUSE 25. The electronic device (102) of clause 18, the rendering-instruction portion (204) comprising HTML mark-up.

CLAUSE 26. The electronic device (102) of clause 18, wherein the at least one additional rendering command (414) is configured to cause a change in appearance of the portion of the content portion (202) to be modified from that of the at least one rendering command (404, 406, 408).

CLAUSE 27. The electronic device (102) of clause 18, wherein the at least one additional rendering command (414) is configured to cause displaying of an auxiliary information not contained within the portion of the content portion (202) to be modified.

CLAUSE 28. The electronic device (102) of clause 27, wherein auxiliary information is at least one of:
- an indication of an action to be executed with the an object;
- additional information associated with the content portion to be modified;
- a translated version of information contained in the content portion to be modified.

CLAUSE 29. The electronic device (102) of clause 18, wherein the at least one additional rendering command (414) is configured to create a visual actuation area in association with the content portion (202) to be modified, the visual actuation area displaying to a user an indication of an action, and in response to the user actuating the visual actuation area, the processor (304) is configured to execute the action.

CLAUSE 30. The electronic device (102) of clause 18, wherein to acquire the electronic document (107) to be rendered, the processor (304) is configured to receive the electronic document (108) from a server (104), the server (104) accessible by the electronic device (102) via a communication network (106).

CLAUSE 31. The electronic device (102) of clause 30, wherein the receiving is executed in response to a user browsing activity.

CLAUSE 32. The electronic device (102) of clause 18, wherein to acquire the electronic document (107) to be rendered, the processor (304) is configured to retrieve electronic document (107) from a memory module (306) of the electronic device (102).

CLAUSE 33. The electronic device (102) of clause 18, wherein to generate at least one additional rendering command (414), the processor (304) is configured to retrieve an indication of a corresponding at least one additional rendering command (410, 412) from a command repository accessible to the electronic device (102).

CLAUSE 34. The electronic device (102) of clause 18, wherein to generate at least one additional rendering command (414), the processor (304) is configured to select, based on the content portion to be modified (202), the at least one additional rendering command (410, 412) from a set of additional rendering commands (410, 412).

One skilled in the art will appreciate when the instant description refers to "receiving data" from a user that the electronic device executing receiving of the data from the user may receive an electronic (or other) signal from the user. One skilled in the art will further appreciate that displaying data to the user via a user-graphical interface (such as the screen of the electronic device and the like) may involve transmitting a signal to the user-graphical interface, the signal containing data, which data can be manipulated and at least a portion of the data can be displayed to the user using the user-graphical interface.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method of rendering an augmented screen-representation of an electronic document, the method executed on an electronic device, the electronic device having a display, the method comprising:
   acquiring, by the electronic device, the electronic document to be rendered, the electronic document comprising a content portion and a rendering-instruction portion, the rendering-instruction portion containing at least one instruction for enabling the electronic device to render the content portion on the display;
   generating, by the electronic device, at least one rendering command, the at least one rendering command based on the at least one instruction, the at least one rendering command for rendering a screen-representation of the electronic document;
   rendering the screen-representation of the electronic document based on the at least one rendering command;
   identifying, by the electronic device, a portion of the content portion to be modified for an augmented presentation of the portion of the content portion in the augmented screen-representation of the electronic document;
   generating, by the electronic device, at least one additional rendering command being configured to cause a change in appearance of the portion of the content portion via the augmented presentation, the augmented presentation of the portion of the content portion being different from a presentation of the portion of the content portion that would result from the at least one rendering command, the at least one additional rendering command not directly derivable from the at least one instruction, the generating the at least one additional rendering command being based on the portion of the content portion to be modified, the at least one rendering command to change presentation of the portion of the content portion to be modified; and
   generating, by the electronic device, instead of the screen-representation of the electronic document, the augmented screen-representation of the electronic document based on a combination of the at least one rendering command and the at least one additional rendering command, without modifying the at least one instruction contained in the rendering-instruction portion of the electronic document, the augmented screen representation having been generated by overlaying the portion of the content portion with the augmented portion of the content portion; and
   wherein:
   the portion of the content portion to be modified is a textual portion, and wherein the identifying the portion of the content portion to be modified comprises:
   identifying a totality of text within the content portion, and
   identifying, within the totality of text, the textual portion to be modified; and
   the identifying, within the totality of text, the textual portion to be modified comprises applying a rule mask.

2. The method of claim 1, wherein the portion of the content portion is a graphical object.

3. The method of claim 1, the rendering-instruction portion comprising HTML mark-up.

4. The method of claim 1, wherein the at least one additional rendering command is configured to cause displaying of an auxiliary information not contained within the portion of the content portion to be modified.

5. The method of claim 1, wherein the at least one additional rendering command is configured to create a visual actuation area in association with the content portion to be modified, the visual actuation area displaying to a user an indication of an action, the method further comprising: in response to the user actuating the visual actuation area, executing the action.

6. The method of claim 1, wherein the generating at least one additional rendering command comprises retrieving an indication of a corresponding at least one additional rendering command from a command repository accessible to the electronic device.

7. The method of claim 1, wherein the generating at least one additional rendering command comprises selecting the at least one additional rendering command from a set of additional rendering commands, the selecting based on the content portion to be modified.

8. An electronic device comprising:
a processor;
an input output module coupled to the processor,
the processor being configured to:
acquire an electronic document to be rendered, the electronic document comprising a content portion and a rendering-instruction portion, the rendering-instruction portion containing at least one instruction for enabling the processor to render the content portion on the input output module;
generate at least one rendering command, the at least one rendering command based on the at least one instruction, the at least one rendering command for rendering a screen representation of the electronic document;
rendering the screen-representation of the electronic document based on the at least one rendering command;
identify a portion of the content portion to be modified for an augmented presentation of the portion of the content portion in an augmented screen-representation of the electronic document;
based on the portion of the content portion to be modified generate, at least one additional rendering command being configured to cause a change in appearance of the portion of the content portion via the augmented presentation, the augmented presentation of the portion of the content portion being different from a presentation of the portion of the content portion that would result from the at least one rendering command, the at least one additional rendering command not directly derivable from the at least one instruction, the at least one rendering command to change presentation of the portion of the content portion to be modified; and
generate, instead of the screen-representation of the electronic document, the augmented screen-representation of the electronic document based on a combination of the at least one rendering command and the at least one additional rendering command, without modifying the at least one instruction contained in the rendering-instruction portion of the electronic document, the augmented screen representation having been generated by overlaying the portion of the content portion with the augmented portion of the content portion; and
wherein:
the portion of the content portion to be modified is a textual portion, and wherein to identify the portion of the content portion to be modified, the processor is configured to:
identify a totality of text within the content portion, and
identify, within the totality of text, the textual portion to be modified; and
to identify, within the totality of text, the textual portion to be modified, the processor is configured to apply a rule mask.

9. The electronic device of claim 8, wherein the portion of the content portion is a graphical object.

10. The electronic device of claim 8, the rendering-instruction portion comprising HTML mark-up.

11. The electronic device of claim 8, wherein the at least one additional rendering command is configured to cause displaying of an auxiliary information not contained within the portion of the content portion to be modified.

12. The electronic device of claim 8, wherein the at least one additional rendering command is configured to create a visual actuation area in association with the content portion to be modified, the visual actuation area displaying to a user an indication of an action, and wherein in response to the user actuating the visual actuation area, the processor is configured to execute the action.

13. The electronic device of claim 8, wherein to generate at least one additional rendering command, the processor is configured to retrieve an indication of a corresponding at least one additional rendering command from a command repository accessible to the electronic device.

14. The electronic device of claim 8, wherein to generate at least one additional rendering command, the processor is configured to select, based on the content portion to be modified, the at least one additional rendering command from a set of additional rendering commands.

* * * * *